Patented July 12, 1949

2,475,673

UNITED STATES PATENT OFFICE 2,475,673

AMINOBENZENESULFONAMIDOHALOPYRAZINES AND METHOD OF PREPARING SAME

Elmore H. Northey, Bound Brook, and John S. Webb, Wenonah, N. J., assignors to American Cyanamid Company, New York, N. Y., a corporation of Maine No Drawing. Application June 26, 1945, Serial No. 601,714

9 Claims. (Cl. 260—239.6)

This invention relates to new organic compounds and to a method of preparing the same.

We have discovered that polyhalopyrazines may be reacted with sulfanilamide to produce aminobenzenesulfonamidohalopyrazines, a group of new compounds having unusual properties. The reaction may be illustrated by the following equation:

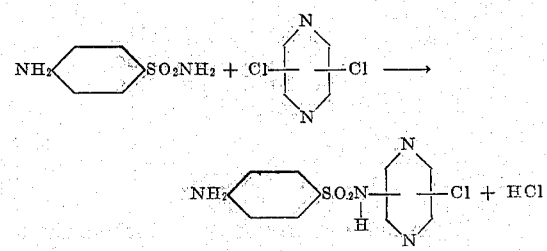

The reaction is unusual in that one of the reactants has two —NH₂ groups whereas the other has a plurality of halogens. Despite this fact, aminobenzenesulfonamidohalopyrazines are obtained with good yields in a relatively high state of purity. There is no evidence of the formation of a disulfanilamidopyrazine, as might be expected.

The reaction is also unusual in that excellent yields of product are obtained without the use of copper powder, coppersalts or other catalytic agents which add expense and purification difficulties to the process.

As illustrated, the reaction involves the formation of a halogen acid. It is desirable, therefore, that an acid-binding agent be present in the reaction mixture to combine with the acid as it is liberated during the reaction. Suitable substances for this purpose include sodium carbonate, potassium carbonate, barium carbonate, sodium bicarbonate, sodium and potassium hydroxide, trisodium phosphate, and the like. In general, any substance which will react with a halogen acid to form a salt stable at the temperature of the reaction may be used as an acid-binding agent.

The reaction is carried out at elevated temperatures, preferably within the range of about 125° C. to 160° C. Temperatures outside these limits, for example from about 120° C. to 175° C., may be employed, at least during part of the reaction period.

In general, the reaction may be carried out by merely mixing together the desired polyhalopyrazine, aminobenzenesulfonamide, and the acid-binding agent. The substantially dry mixture is then heated within the temperature range indicated above. Completion of the reaction may be conveniently determined by observation of the rate at which acid is formed in the reaction mixture, for example by noting the evolution of carbon dioxide gas when a carbonate is used as the acid-binding substance. The reaction mixture is collected, dissolved in water, and then treated to recover unreacted polyhalopyrazine and sulfanilamide. The 2-sulfonamidobenzenehalopyrazine reaction product may be recovered from its aqueous solution in the form of the relatively insoluble free acid by treating a solution of one of its salts with an acid stronger than the free acidic 2 - sulfonamidobenzenehalopyrazine.

Of course, the reaction may be carried out in the presence of an inert solvent if desired. The solvent should have a boiling point above about 130° C.; otherwise the use of pressure vessels is necessary to attain the reaction temperatures required.

The hydrogen attached to the nitrogen atom of the amide group is acidic in character and it is possible, therefore, to prepare alkali metal, alkaline earth metal, and other cationic salts of the product. These may be prepared by simply treating the free sulfonamide with an aqueous solution of a suitable alkaline substance. The alkali metal and alkaline earth metal salts are more water soluble than the free sulfonamide and are useful in this form for many purposes.

The new aminobenzenesulfonamidohalopyrazines of the present invention possess unusual therapeutic properties in that they are relatively non-toxic and are highly effective in the treatment of bacterial infections while at the same time they are extremely effective in the treatment of certain diseases caused by protozoa; for example, coccidiosis, caused by *Eimeria tenella*, in poultry, sheep, cattle, rabbits, and other animals. These new compounds and, in particular, 2 - sulfanilamido-5-chloropyrazine, are many times more effective in the treatment of coccidiosis in chickens than the most effective sulfonamide yet described.

Our invention will now be illustrated by means of the following examples in which the preparation of dichloropyrazines, which are in themselves new compounds, and the preparation of certain aminobenzenesulfonamidohalopyrazines is described. It will be understood that the particular details thereof are subject to variation within the scope of the invention as described hereinabove and set forth in the appended claims. All parts are by weight unless otherwise indicated.

Example 1

The dichloropyrazines employed in this and the succeeding examples were prepared by the vapor phase chlorination of pyrazine. A solution of pyrazine in water is vaporized and mixed with chlorine at approximately 350° C. The mixed vapors are passed through a glass or stainless steel tube and heated between 400° C. and 500° C. for two to three seconds. The vapors are condensed and collected in a receiving vessel in which the products separate into two layers. The oily layer consists essentially of chloropyrazines. The isomeric 2,3-, 2,5-, and 2,6-dichloropyrazines may be recovered from the oil by separating the fraction boiling between 94 and 107° C. at 50 mm. pressure. When this fraction is allowed to crystallize at room temperature the 2,6-dichloropyrazine contained therein separates and may be recovered by filtration. The product is purified by recrystallizing from anhydrous alcohol. The 2,6-dichloropyrazine has a melting range of 53.1–53.8° C. and a dipole moment of 1.52$\mu$.

By crystallizing the dichloropyrazine mother liquors at successively lower temperatures crystals of 2,3-dichloropyrazine and 2,5-dichloropyrazine are obtained. These crystals may be purified by melting, partial refreezing, and filtration. The 2,3-dichloropyrazine has a melting range of from 22 to 24° C. and a dipole moment of 2.07$\mu$ whereas the 2,5-dichloropyrazine has a melting range of −4 to −1° C. and a dipole moment of 1.14$\mu$.

To prepare 2-sulfanilamido-3-chloropyrazine a suitable reaction vessel is charged with 100 parts by weight of 2,3-dichloropyrazine, 115 parts by weight of sulfanilamide and 92 parts by weight of potassium carbonate (dehydrated and pulverized). The nearly dry charge is then heated with mixing. At an internal temperature of 123°, the charge becomes more fluid and evolution of carbon dioxide begins. The temperature of the charge rapidly rises to 152° where water and dichloropyrazine reflux in the condenser. During the next 20 minutes, the charge gradually thickens. When evolution of gas stops, the charge is cooled below 100°, and is dissolved by the addition of 630 parts by weight of water, except for a small amount of unchanged dichloropyrazine. The solution is then distilled with steam to recover about 35 parts of unchanged 2,3-dichloropyrazine. The solution remaining in the still is then cooled to 10° where the unchanged sulfanilamide crystallizes from solution. When crystallization is complete, the sulfanilamide is filtered, washed with water, and dried, giving a recovery of about 17 parts by weight of sulfanilamide suitable for re-use.

The mother liquor and washings are combined and the 2-sulfanilamido-3-chloropyrazine precipitated by adjusting the pH to 3 with hydrochloric acid. The product is separated by filtration, washed free of salt and dried. The yield of crude 2-sulfanilamido-3-chloropyrazine is 115 (88%) of theoretical) parts by weight. It may be purified by dissolving as the sodium salt, treating with an activated charcoal and re-precipitating with a mineral acid, or by other purification procedures obvious to those skilled in the art. The product as obtained on drying at 45° C. is a monohydrate having a melting point of 156.8 to 157.0° C.

Example 2

By following the procedure of Example 1, starting with the isomeric 2,5-dichloropyrazine, 2-sulfanilamido-5-chloropyrazine was prepared. This was obtained as an anhydrous product, melting at 211.9–213.7° C.

Example 3

By following the procedure of Example 1, start- with 2,6-dichloropyrazine, 2-sulfanilamido-6-chloropyrazine was obtained, having a melting range of 234.8–235.4° C.

Example 4

Metaaminobenzenesulfonamide was used to replace the sulfanilamide of Example 1. The product, 2-metanilamido-5-chloropyrazine, had a melting point of 176.9° C.

We claim:
1. Para-aminobenzenesulfonamidohalo p y r a - zines and salts thereof.
2. Para - aminobenzenesulfonamidochloropyrazines.
3. 2-sulfanilamido-3-chloropyrazine.
4. 2-sulfanilamido-5-chloropyrazine.
5. 2-sulfanilamido-6-chloropyrazine.
6. A method of preparing aminobenzenesulfonamidohalopyrazines which comprises mixing together and heating sulfanilamide with a polyhalopyrazine and an acid-binding substance at temperatures within the range 120° to 175° C.
7. A method of preparing aminobenzenesulfonamidohalopyrazines which comprises mixing together and heating sulfanilamide with a dichloropyrazine and an alkali metal carbonate at temperatures within the range 120° to 175° C.
8. A method of preparing aminobenzenesulfonamidochloropyrazines which comprises mixing together and heating sulfanilamide with a dichloropyrazine and potassium carbonate at temperatures within the range 120° to 175° C.
9. A method of preparing 2-sulfanilamido-5-chloropyrazine which comprises mixing together and heating in the presence of an alkali metal carbonate 2,5-dichloropyrazine and sulfanilamide.

ELMORE H. NORTHEY.
JOHN S. WEBB.

REFERENCES CITED

The following references are of record in the file of this patent:

UNITED STATES PATENTS

| Number | Name | Date |
|---|---|---|
| 2,259,222 | Ewins et al. | Oct. 14, 1941 |
| 2,403,776 | Winnek | July 9, 1946 |
| 2,423,108 | Moore et al. | July 1, 1947 |

OTHER REFERENCES

Southern Med. J., vol. 34, April, 1941, pp. 446, 447. Copy in 260–239.6.